United States Patent [19]
Gehani et al.

[11] Patent Number: 5,946,687
[45] Date of Patent: Aug. 31, 1999

[54] GEO-ENABLED PERSONAL INFORMATION MANAGER

[75] Inventors: Narain H. Gehani, Summit; William D. Roome, Murray Hill, both of N.J.; Richard James Trapp, Charlotte, N.C.

[73] Assignee: Lucent Technologies Inc., Murray Hill, N.J.

[21] Appl. No.: 08/949,074

[22] Filed: Oct. 10, 1997

[51] Int. Cl.⁶ .................................................. G06F 17/30
[52] U.S. Cl. ............................................ 707/10; 707/104
[58] Field of Search ................................. 707/3, 10, 104; 340/995, 988; 701/200, 208, 209, 211; 708/110; 709/203, 219

[56] References Cited

U.S. PATENT DOCUMENTS

| | | | |
|---|---|---|---|
| 5,032,989 | 7/1991 | Tornetta | 364/401 |
| 5,504,482 | 4/1996 | Schreder | 340/995 |
| 5,613,055 | 3/1997 | Shimoura et al. | 395/173 |
| 5,765,123 | 6/1998 | Nimura et al. | 701/288 |
| 5,771,280 | 6/1998 | Johnson | 379/93.23 |
| 5,784,059 | 7/1998 | Morimoto et al. | 345/353 |
| 5,802,492 | 9/1998 | Delorne | 701/200 |
| 5,848,373 | 12/1998 | DeLorme et al. | 701/200 |
| 5,852,810 | 12/1998 | Sotiroff et al. | 705/27 |

OTHER PUBLICATIONS

Any Who Directory Service, <http://www.anywho.com>, three pages, date unknown.

Maps On Us, <http:www.MapsOnUs.com>, 1 page, date unknown.

Kaplan et al. "Understanding GPS principles and applications" Journal of Electronic Defense, pp. 81–86, Jan. 1997.

Lee "A mode less traveled" Forbes, pp. 110–110, Feb. 1997.

Anonymous "MapQuest partners with WebCrawlwer, announces alliances" Information Today, pp. 38–40, Feb. 1997.

*Primary Examiner*—Paul V. Kulik

[57] ABSTRACT

A personal information manager computer program for storing names, addresses, telephone numbers and the like for personal and business contacts includes a capability for delivering geographic information in response to user requests. The personal information manager provides a display which includes one or more fields for entering or selecting contact information. The display also includes a number of buttons for requesting different types of geographic information, such as maps, directions, weather and yellow pages information. When the user clicks on one of the buttons, the personal information manager utilizes an address or other location identifier associated with the contact name to format a request to a geographic information server. The server uses the location identifier to retrieve the appropriate geographic information for that location, and sends the information to the personal information manager for display.

37 Claims, 3 Drawing Sheets

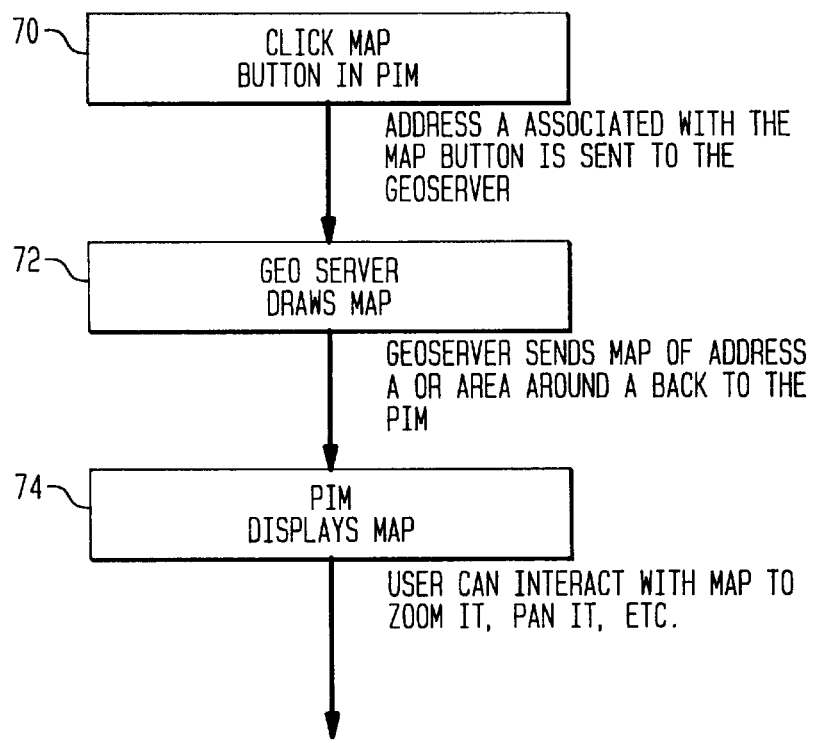
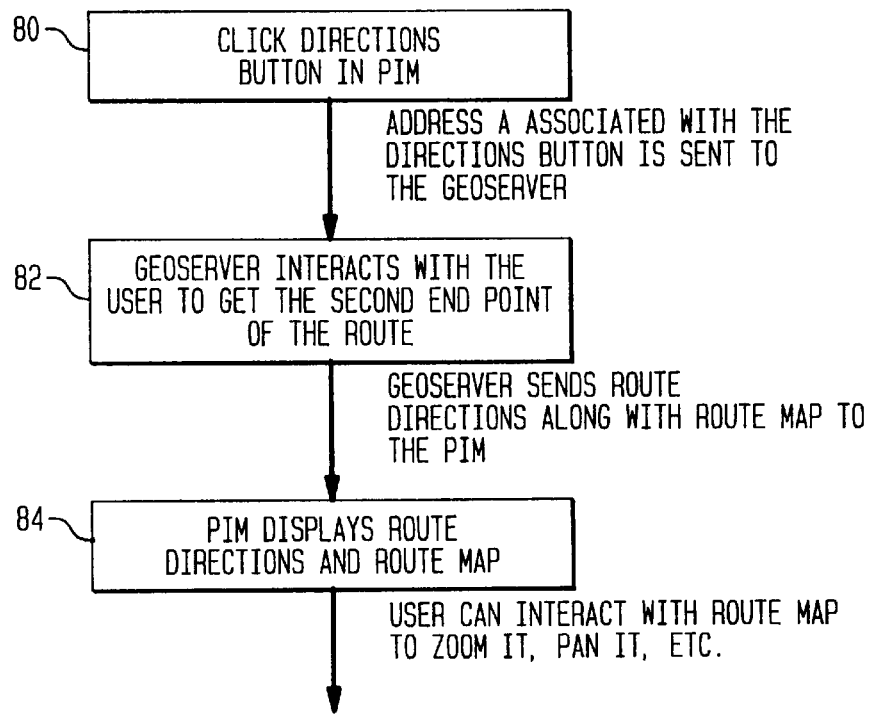

GEO-ENABLED PERSONAL INFORMATION MANAGER

Field of the Invention

The present invention relates generally to software programs for managing personal information, and more particularly to personal information management programs which store and process addresses or other types of location information.

BACKGROUND OF THE INVENTION

A personal information manager is an application program that allows users to maintain and track information such as names, addresses and telephone numbers of businesses and personal and business contacts. The many different types of personal information managers currently available are known by generic names such as address books, contact managers, record keepers, organizers, and schedulers. Examples of information that may be stored in a personal information manager include a person's name, title, company name, company address, home address, telephone and facsimile numbers, e-mail address, scheduled activities, and notes. Commercially available personal information managers include "Maximizer" from Maximizer Technologies, "Act" from Symantec Corporation, "Janna Contact" from Janna Systems Inc. of Toronto, Ontario, Canada, "Schedule+" from Microsoft Corporation of Redmond, Wash., USA, and "Lotus Organizer" from IBM Corp. of Armonk, New York, USA. Personal information managers may also be a part of larger application programs, such as, for example, the Netscape web browser from Netscape Communications Corp. of Mountain View, Calif., USA and Lotus Notes from IBM Corp. The personal information manager capability in the Netscape web browser is referred to as "Address Book" and in the Lotus Notes program is referred to as "C&S" or "Calender and Scheduler."

A significant problem with these and other conventional personal information managers is that the managers generally do not include an efficient or convenient mechanism for obtaining additional geographic information relating to the stored personal information. For example, a conventional personal information manager generally cannot easily obtain maps, directions, weather, yellow pages and other types of geographic information specific to a street address previously stored by the personal information manager. As a result, a user must use other techniques to obtain this information, such as re-entering the address into an on-line geographic information service or another software product. This is inefficient and a source of considerable inconvenience and annoyance for the user.

SUMMARY OF THE INVENTION

We have recognized that there exists a need for a personal information manager which can directly and efficiently provide a user with maps, directions, weather and other geographic information specific to an address or location stored by the manager, without requiring the user to independently access a separate service or re-enter previously stored information. Therefore, the present invention provides a personal information manager which allows a user to access geographic information regarding an address or other suitable location identifier previously stored or otherwise supplied in the personal information manager. We refer to such a personal information manager as a "geo-enabled" personal information manager. In an exemplary embodiment, the personal information manager provides a computer display screen which includes one or more buttons specifying one or more different types of geographic information. To locate a specific record, a user enters or selects a contact name or similar record identifier in a field of the display, and the personal information manager retrieves the corresponding record from a database. The retrieved record includes an address or other location identifier. When the user clicks on one of the buttons specifying a given type of geographic information, the personal information manager utilizes the location identifier to format a request for that type of geographic information, and sends the request to a geographic information server. The server processes the request and delivers geographic information specific to the location identifier back to the personal information manager for display to the user.

Alternative embodiments of the invention may operate without the need for a previously-stored record. For example, upon initially entering a portion of a record in the personal information manager, a user can click one of the buttons to request geographic information for the portion of the record already entered, even though the record has not yet been stored in a database. The geographic information server may be running on the same computer as the personal information manager, or on a different computer which communicates with the personal information manager computer over the Internet or other communication network.

Advantageously, the invention makes it unnecessary for a user to access other programs or re-enter previously-stored addresses or other location identifiers in order to obtain corresponding geographic information. A personal information manager in accordance with the invention is thus considerably more efficient and convenient to use than the above-noted conventional personal information managers.

BRIEF DESCRIPTION OF THE DRAWINGS

FIGS. 4, 5, 6 and 7 are flow diagrams illustrating operations involved in processing map, direction, weather and yellow page information, respectively, in the system of FIG. 1.

DETAILED DESCRIPTION OF THE INVENTION

The invention will be illustrated below in conjunction with an exemplary personal information manager and geographic information server. Although particularly well-suited for obtaining geographic information over the Internet using Transmission Control Protocol/Internet Protocol (TCP/IP) connections, the invention is not limited to use with any particular type of network or network communication protocol. The disclosed techniques are suitable for use with a wide variety of other networks and protocols, and many different types of mapping and routing programs which may be installed on a client computer. The term "geographic information" as used herein is intended to include not only the map, direction, weather and yellow page information described in conjunction with the illustrative embodiments, but any other type of information which is specific to an address or other location identifier. The term "location identifier" is intended to include not only full or partial addresses, but any other information, including a city, town or zip code, that may be used to identify a geographical area associated with a record stored by a personal information manager. A "geo-enabled" personal information manager refers generally to program for processing information which is capable of directly accessing geographic information based on location identifiers. The term "button" in the context of a display screen of a personal information manager is intended to include not only icons, but also hypertext web links and other suitable representations which may be used to initiate an information request.

Figure 1:
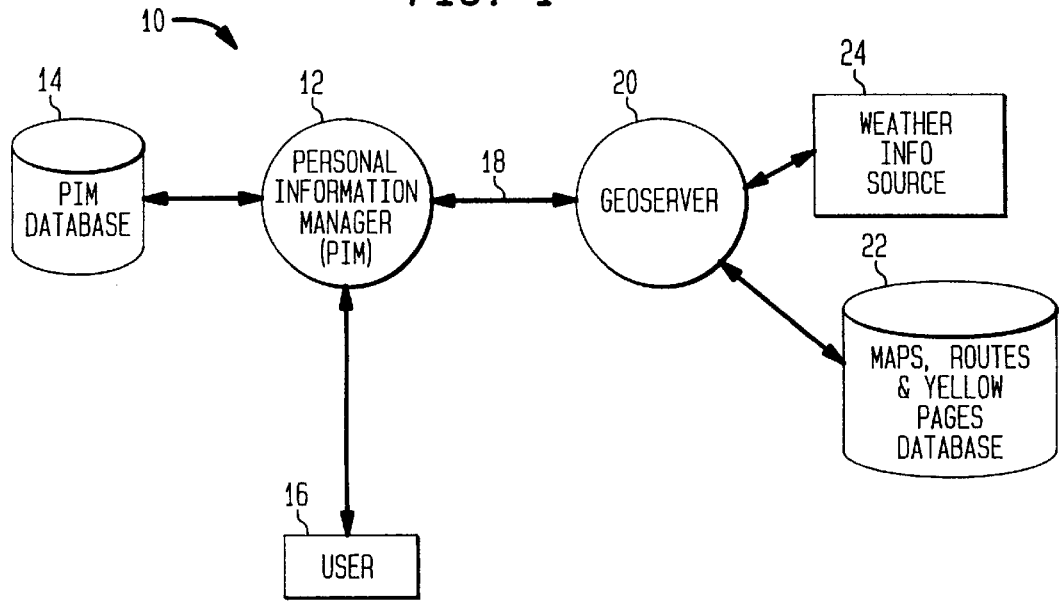
FIG. 1 shows an exemplary embodiment of the invention in which a geo-enabled personal information manager (PIM) interacts with a geographic information server (GeoServer)

FIG. 1 illustrates portions of a computer system 10 in accordance with an exemplary embodiment of the invention. The system 10 includes a "geo-enabled" personal information manager (PIM) 12 and a PIM database 14. The PIM 12 is a computer software program which runs on a computer of the system 10 and allows a user 16 to maintain and track information such as names, addresses and telephone numbers of personal and business contacts. The PIM 12 may be implemented as, for example, an address book program, a contact manager program, a record keeper program, an organizer program, or a scheduler program. The PIM 12 may be a stand-alone application program, or a program embedded in a larger application program such as a web browser or document processing program. Like a conventional PIM, the PIM 12 may store information such as name, title, company name, company address, home address, telephone and facsimile numbers, e-mail address, scheduled activities, and notes for a number of personal or business contacts, businesses and the like. The PIM 12 stores this information as a set of records in the PIM database 14, which may be a hard disk of a computer running the PIM program, or any other suitable memory.

The system 10 further includes a communication path 18 which connects the PIM 12 with a geographic information server (GeoServer) 20. The GeoServer 20 serves maps, direction routes, weather, yellow pages and other types of geographic information to application programs which contact it. The GeoServer 20 utilizes a maps, routes and yellow page database 22, and information from a weather information source 24, to compile geographic information to application programs in response to user requests. An example of a GeoServer 20 is the "Maps On Us" server accessible over the Internet at web address http:\\www.MapsOnUs.com. In accordance with the invention, the PIM 12 is enabled to send an address or other location identifier directly to the GeoServer 20 in response to a user-entered command. The GeoServer 20 responds by delivering the requested geographic information to the PIM 12 for display to the user. The user can thus directly retrieve current geographic information corresponding to addresses or other location identifiers previously stored in the PIM database 14 via PIM 12, without having to re-enter the identifiers in a separate geographic information program. The GeoServer 20 can reside on the same computer as PIM 12 or on a separate computer. In the latter implementation, the PIM 12 and GeoServer 20 may communicate over a TCP/IP connection established over the Internet.

Figure 2:
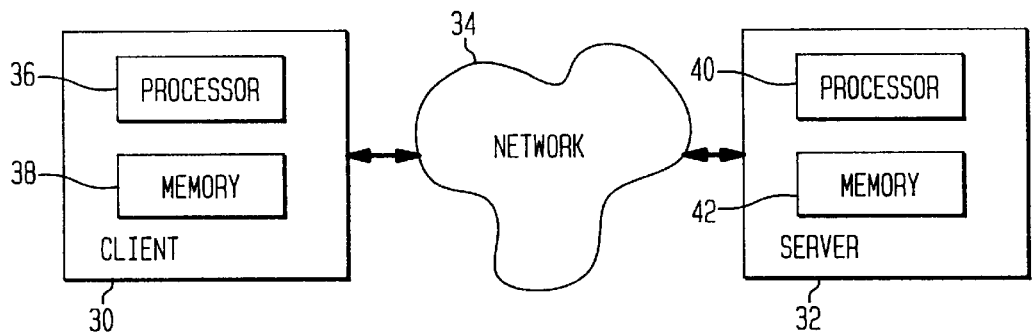
FIG. 2 is a block diagram of a client-server system in which the geo-enabled PIM and GeoServer of FIG. 1 may be implemented.

FIG. 2 shows a network-based implementation of the system 10 of FIG. 1. In this implementation, a client 30 communicates with a server 32 over a network 34. The client 30 and server 32 are computers associated with the system 10. The PIM 12 of FIG. 1 is running in an application layer of the client 30, while the server 32 corresponds to the GeoServer 20. The client 30 includes a processor 36 and a memory 38, and the server 32 includes a processor 40 and a memory 42. The memories 38 and 42 may include electronic memory, disk-based memory or both, as well as other types of memory. The PIM 12 responds to a user-entered request for geographic information regarding a particular location identifier by generating a corresponding Hypertext Transfer Protocol (HTTP) request. A TCP/IP connection is then established between the client 30 and server 32 to process the request. The geographic information request may be received in an application layer of the server 32, and responded to by a file transfer system or other program run by processor 40. The requested geographic information may be designated in part by a uniform resource locator (URL) which includes a domain name identifying the server 32. In alternative embodiments, the request may be generated by another program running on the client 30, such as a browser program, which receives a location identifier and other request-related information from the PIM 12 and formats it into an appropriate request.

Figure 3:
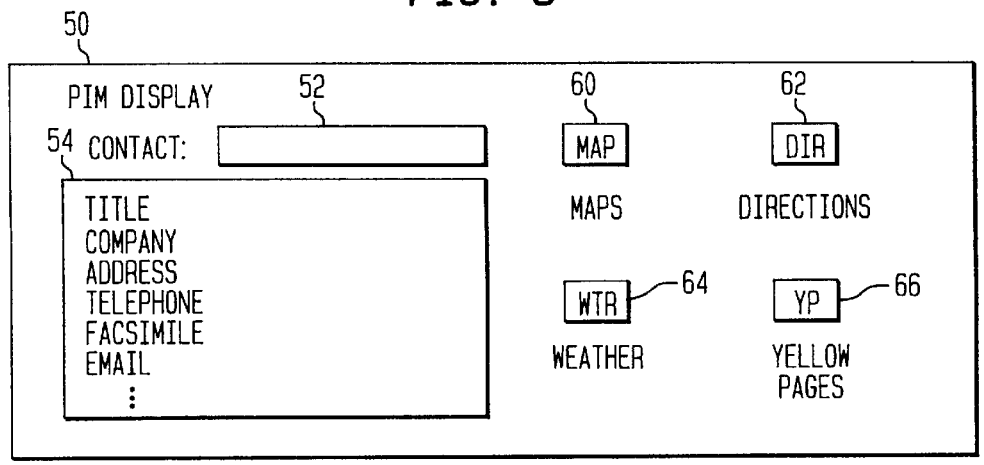
FIG. 3 shows a portion of an illustrative display which may be generated by the geo-enabled PIM of FIG. 1 in accordance with the invention.

FIG. 3 shows a portion of a display 50 which may be generated by the PIM 12 of FIG. 1 and displayed to the user 16. The PIM display 50 includes a field 52 for the user to enter the name of a contact. The contact name may be the name of a person or business, or any other identifier of a record which has been stored or is to be stored in the PIM database 14. Upon an initial entry of a given contact name, the PIM 12 may prompt the user to enter the corresponding contact information in field 54. If the user has previously stored a record for the contact name entered in field 52, the information in that record may be retrieved by PIM 12 and displayed to the user in field 54. The record stored for a given contact name may include a title, company name, address, telephone number, facsimile number, e-mail address or any other information regarding the contact.

The display 50 also includes a number of buttons 60, 62, 64 and 66 which correspond to different types of geographic information which the user can request from the GeoServer 20 within the display 50. The buttons in this embodiment include MAP button 60, DIRECTIONS (DIR) button 62, WEATHER (WTR) button 64 and YELLOW PAGES (YP) button 66. The user enters a given request for geographic information by pointing to and clicking the corresponding button using a mouse or other similar user interface device. In this embodiment, a request for geographic information is based on an address A of the contact in field 52. The address A may be a complete business or home address, or a portion thereof such as a state, city, town or zip code. The PIM 12 incorporates this address or a suitable portion or representation thereof into a geographic information request which is sent to the GeoServer 20 in the manner previously described. It should be noted that although in this embodiment each button 60, 62, 64 and 66 is used to generate a different type of request to a single GeoServer 20, in other embodiments each button may be used to generate a request to a different server. Other possible implementations of the display could utilize a separate set of buttons for each of a number of different displayed records or record identifiers, or alternatively a single set of buttons which would apply to a highlighted record identifier in a set of displayed record identifiers.

FIG. 4 is a flow diagram illustrating the process steps involved in accessing map information via the display 50 of PIM 12. It will be assumed for the flow diagrams of FIGS. 4 through 7 that the user has already entered a contact name in the field 52 of display 50. Step 70 of FIG. 4 indicates that the user clicks on the MAP button 60 in order to request map information associated with an address A of the contact name. As previously noted, the address A may have already been stored in the PIM database 14 during previous interaction with PIM 12, or may have just been entered by the user in the field 54. In either case, the address A associated with the contact name in field 52 is sent to the GeoServer 20 in the manner described above. The GeoServer 20 uses the address A and map information stored in database 22 to "draw" or construct a map including address A or its surrounding area. The resulting map is then sent back to the PIM 12 via the communication path 18, as shown in step 72. In step 74, the PIM 12 displays the map to the user. The map could be a static map or an interactive map. In the latter case, the user can interact with the map by zooming in or out, panning, and the like. The user could also be prompted to indicate if directions are required to or from address A, and the map may be used to plan a route in a manner similar to that to be described below for the DIRECTIONS button 62. Alternative embodiments of the invention may allow a user to select two or more addresses previously entered into the PIM 12. The GeoServer 20 responds to a request from PIM 12 including multiple specified addresses with a map of an area which includes all of the specified addresses.

FIG. 5 is a flow diagram illustrating the process steps involved in accessing directions via the display 50 of PIM 12. Step 80 indicates that the user clicks the DIRECTIONS button 62 in the display 50 to request directions. The address A associated with the contact name in field 52 is then sent to the GeoServer 20. In step 82, the GeoServer 20 interacts with the user to obtain a second address. The GeoServer 20 first asks the user if the address A is the start address or the end address of the requested route. If address A is the start address, the user is requested to supply the end address. Otherwise, the user is requested to supply the start address. The GeoServer 20 uses the start and end addresses to plan a route between the start and end addresses, and sends the route directions along with a corresponding route map to the PIM 12. In step 84, the PIM 12 displays the route directions and route map to the user. As with the map information described in conjunction with FIG. 4, the route map displayed in step 84 may be interactive such that the user can zoom it, pan it, etc. In alternative embodiments of the invention, both the start and end addresses of a desired route may be provided by the PIM 12 in initial request to the GeoServer 20. The above-noted alternative embodiments which permit a user to specify two or more addresses for inclusion in a request to GeoServer 20 may respond with a route which includes all of the specified addresses. Such a route may, for example, start from a particular address previously entered into the PIM 12, such as a home or work address, or from another address explicitly supplied to the GeoServer 20, and proceed through the remaining addresses in accordance with a specified sequence.

Figure 6:
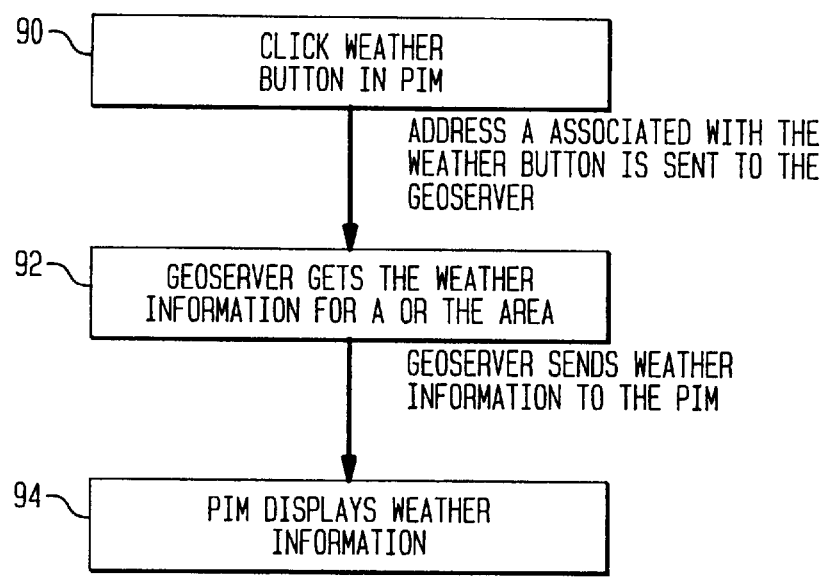

FIG. 6 is a flow diagram illustrating the process steps involved in accessing weather information via the display 50 of PIM 12. Step 90 indicates that the user clicks the WEATHER button 64 in the display 50 to request weather information. The address A associated with the contact name in field 52 is then sent to the GeoServer 20. In step 92, the GeoServer 20 uses the address A to retrieve weather information for an area or region including address A. The resulting information is then sent back to the PIM 12 via the communication path 18, and is displayed to the user as shown in step 94. The weather information may include current weather conditions as well as a forecast for an area including address A. The area may be based on city, state, zip code or other suitable information in the address A.

Figure 7:
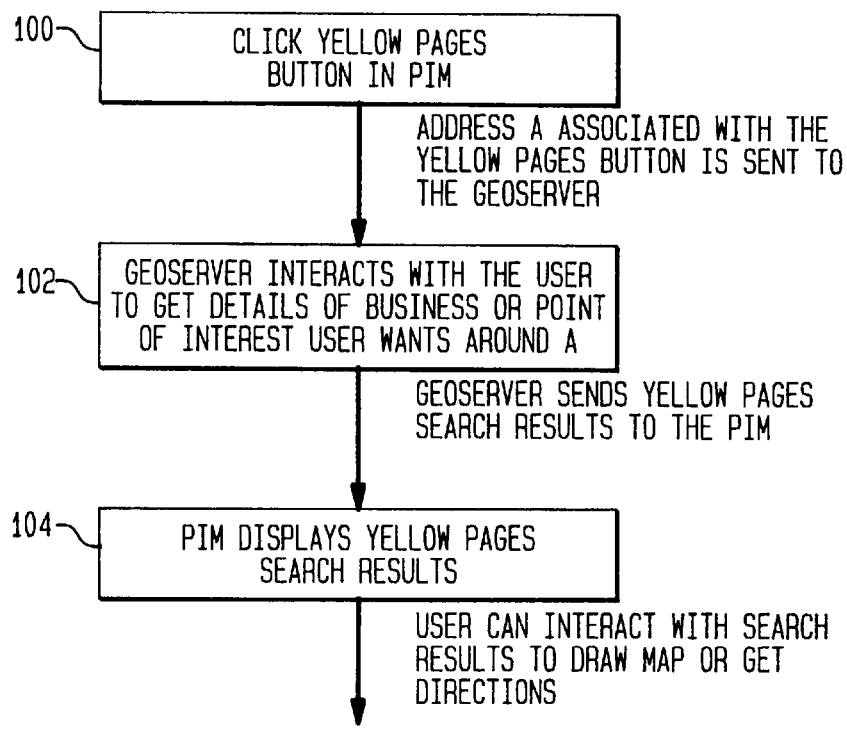

FIG. 7 is a flow diagram illustrating the process steps involved in accessing yellow pages information via the display 50 of PIM 12. Step 100 indicates that the user clicks the YELLOW PAGES button 66 in the display 50 to request yellow pages information. The address A associated with the contact name in field 52 is then sent to the GeoServer 20. In step 102, the GeoServer 20 interacts with the user to determine additional details regarding the businesses or points of interest around A that the user would like to see. For example, the user may be permitted to request addresses and/or phone numbers for the businesses and points of interest around A. The GeoServer 20 searches for the specific yellow page information requested by the user, and sends the search results to the PIM 12. In step 104, the PIM 12 displays the search results to the user. The user may be permitted to interact with the search results to obtain a map or route directions.

The above-described embodiments of the invention are intended to be illustrative only. Alternative embodiments may utilize different servers to supply different types of geographic information, and may use hypertext web links in place of the display buttons described in conjunction with FIG. 3. Although illustrated in FIG. 3 as providing a contact manager function, a geo-enabled PIM in accordance with the invention may be implemented as an address book, a record keeper, an organizer, a scheduler or any other application program which stores location identifiers. These and numerous other alternative embodiments within the scope of the following claims will be apparent to those skilled in the art.

What is claimed is:

1. A method of providing access to geographic information in a computer system, the method comprising the steps of:

displaying at least a portion of a record in a display screen of a personal information manager program running on a computer of the system, wherein the record includes a location identifier; and generating, in response to a user command, a request from the personal information manager program for retrieval of geographic information associated with the location identifier.

2. The method of claim 1 wherein the location identifier is an address of a contact for which a user stores information in the personal information manager program.

3. The method of claim 1 wherein the geographic information associated with the location identifier includes a map of an area which includes a location specified by the location identifier.

4. The method of claim 1 wherein the geographic information associated with the location identifier includes directions from another location to a location specified by the location identifier.

5. The method of claim 1 wherein the geographic information associated with the location identifier includes directions to another location from a location specified by the location identifier.

6. The method of claim 1 wherein the geographic information associated with the location identifier includes weather information associated with an area which includes a location specified by the location identifier.

7. The method of claim 1 wherein the geographic information associated with the location identifier includes yellow pages information associated with an area which includes a location specified by the location identifier.

8. The method of claim 1 wherein the displaying step includes retrieving a previously-stored record, including a location identifier associated with the previously-stored record.

9. The method of claim 1 wherein the displaying step includes displaying a location identifier entered by a user creating a new record for storage by the personal information manager program.

10. The method of claim 1 wherein the geographic information is stored on the computer running the personal information manager program.

11. The method of claim 1 wherein the personal information manager program is running on a first computer of the system, the geographic information is accessible through another program running on a second computer of the system, and the generating step includes generating a request from the personal information manager program for retrieving the geographic information over a network connection established between the first and second computers.

12. The method of claim 1 wherein the generating step includes generating the request in the personal information manager program.

13. The method of claim 1 wherein the generating step includes generating the request in another program running on the computer, wherein the other program receives a location identifier and other request-related information from the personal information manager program and formats it to generate the request.

14. An apparatus for providing access to geographic information in a computer system, the method comprising the steps of:
    means for displaying at least a portion of a record in a display screen of a personal information manager program running on a computer of the system, wherein the record includes a location identifier; and
    means for generating, in response to a user command, a request from the personal information manager program for retrieving geographic information associated with the location identifier.

15. The apparatus of claim 14 wherein the location identifier is an address of a contact for which a user stores information in the personal information manager program.

16. The apparatus of claim 14 wherein the geographic information associated with the location identifier includes a map of an area which includes a location specified by the location identifier.

17. The apparatus of claim 14 wherein the geographic information associated with the location identifier includes directions from another location to a location specified by the location identifier.

18. The apparatus of claim 14 wherein the geographic information associated with the location identifier includes directions to another location from a location specified by the location identifier.

19. The apparatus of claim 14 wherein the geographic information associated with the location identifier includes weather information associated with an area which includes a location specified by the location identifier.

20. The apparatus of claim 14 wherein the geographic information associated with the location identifier includes yellow pages information associated with an area which includes a location specified by the location identifier.

21. An apparatus for providing access to geographic information in a computer system, the apparatus comprising:
    a processor running a personal information manager program for displaying to a user at least a portion of a record which includes a location identifier, wherein the processor is operative to generate, in response to a user command, a request to retrieve geographic information associated with the location identifier; and
    a memory coupled to the processor for storing the record and corresponding location identifier.

22. The apparatus of claim 21 wherein the location identifier is an address of a contact for which a user stores information in the personal information manager program.

23. The apparatus of claim 21 wherein the geographic information associated with the location identifier includes a map of an area which includes a location specified by the location identifier.

24. The apparatus of claim 21 wherein the geographic information associated with the location identifier includes directions from another location to a location specified by the location identifier.

25. The apparatus of claim 21 wherein the geographic information associated with the location identifier includes directions to another location from a location specified by the location identifier.

26. The apparatus of claim 21 wherein the geographic information associated with the location identifier includes weather information associated with an area which includes a location specified by the location identifier.

27. The apparatus of claim 21 wherein the geographic information associated with the location identifier includes yellow pages information associated with an area which includes a location specified by the location identifier.

28. The apparatus of claim 21 wherein the processor is further operative to retrieve a previously-stored record, including a location identifier associated with the previously-stored record, and to display a portion of the previously-stored record to the user.

29. The apparatus of claim 21 wherein the processor is further operative to display a location identifier entered by a user creating a new record for storage by the personal information manager program.

30. The apparatus of claim 21 wherein the geographic information is stored in a storage location associated with a computer which includes the processor running the personal information manager program.

31. The apparatus of claim 21 wherein the processor running the personal information manager program is associated with a first computer of the system, the geographic information is accessible through another program running on a second computer of the system, and the processor is further operative to retrieve the geographic information over a network connection established between the first and second computers.

32. The apparatus of claim 21 wherein the request from the personal information manager program is generated by the personal information manager program.

33. The apparatus of claim 21 wherein the request from the personal information manager program is generated by another program running on the computer, wherein the other program receives a location identifier and other request-related information from the personal information manager program and formats it to generate the request.

34. A method of providing access to geographic information in a computer system, the method comprising the steps of:
    displaying at least a portion of a record in a display screen of a personal information manager program running on a computer of the system, wherein the record includes a location identifier; and
    automatically retrieving from another program geographic information associated with the location identifier in response to a user command.

35. An apparatus for providing access to geographic information in a computer system, the apparatus comprising:
    a processor running a personal information manager program for displaying to a user at least a portion of a record which includes a location identifier, wherein the processor is operative to automatically retrieve from another program geographic information associated with the location identifier in response to a user command; and a memory coupled to the processor for storing the record and corresponding location identifier.

36. A method of providing access to geographic information in a computer system, the method comprising the steps of:

displaying at least a portion of a record in a display screen of a personal information manager program running on a client computer, wherein the record includes a location identifier; and generating, in response to a user command, a request from the personal information manager program for retrieval of geographic information associated with the location identifier, wherein the request is delivered over a network connection to a server computer having access to the geographic information.

37. An apparatus for providing access to geographic information in a computer system, the apparatus comprising:

a processor associated with a client computer and running a personal information manager program for displaying to a user at least a portion of a record which includes a location identifier, wherein the processor is operative to generate, in response to a user command, a request from the personal information manager program for retrieval of geographic information associated with the location identifier, such that the request is delivered over a network connection to a server computer having access to the geographic information; and a memory coupled to the processor for storing the record and corresponding location identifier.

* * * * *